Jan. 16, 1934. W. W. VOSPER 1,943,643
POWER TOOL
Filed Sept. 21, 1931 5 Sheets-Sheet 1
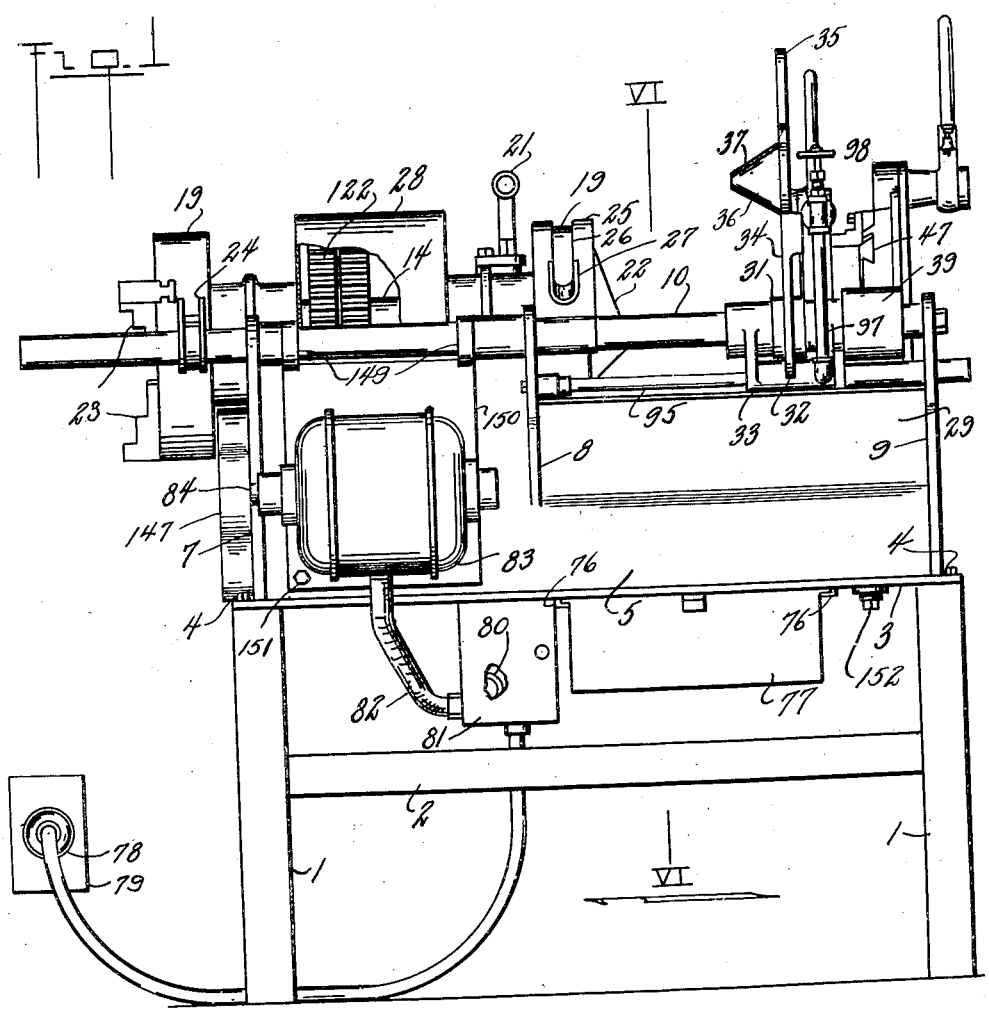
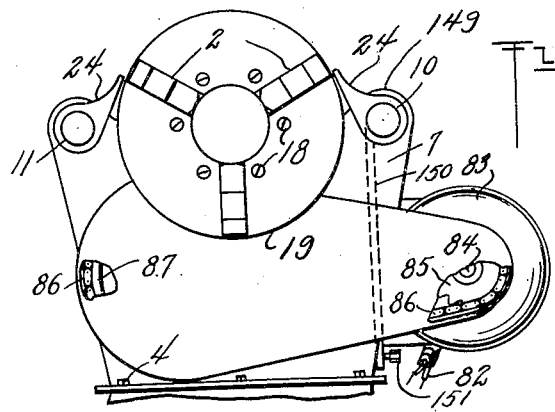

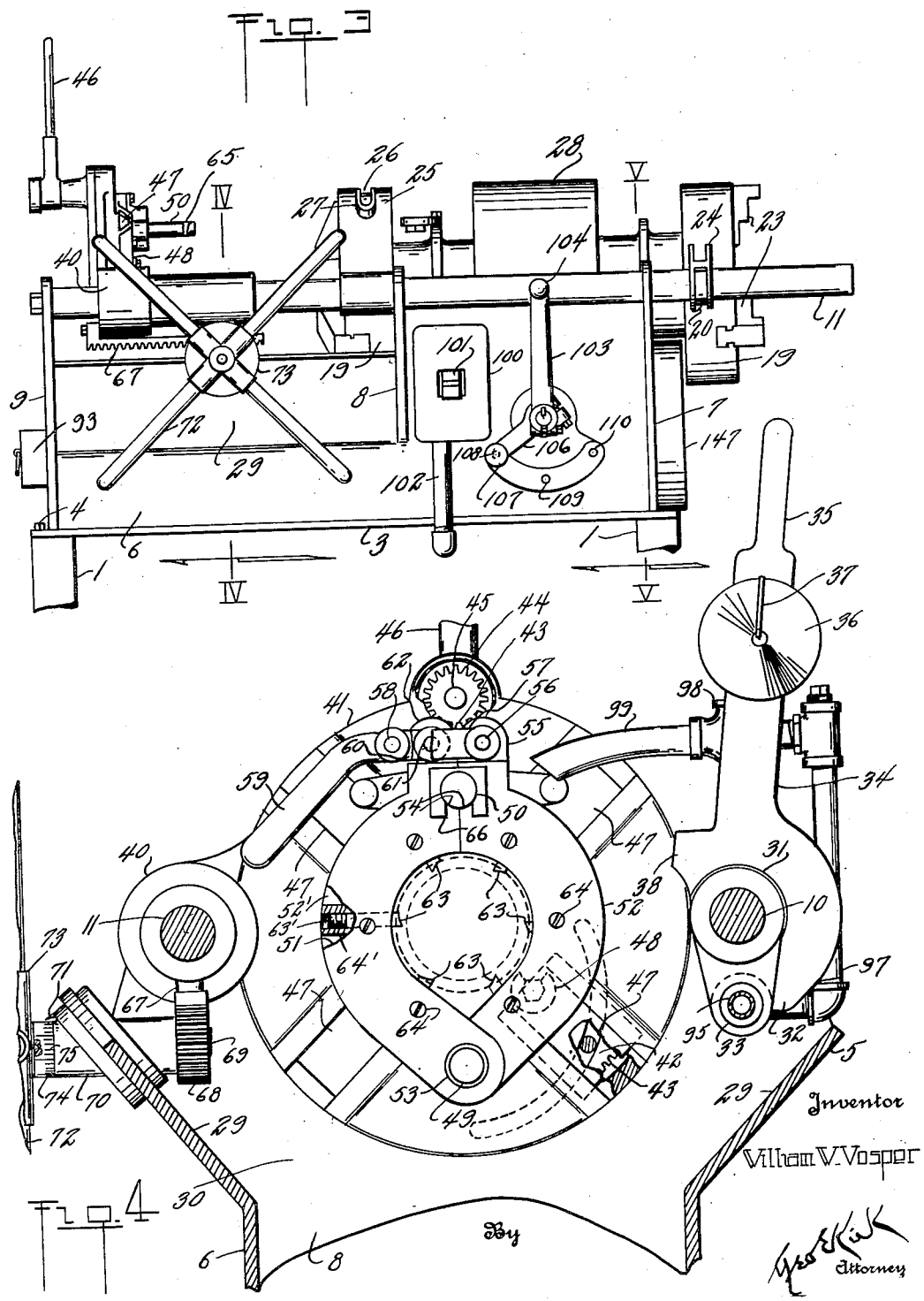

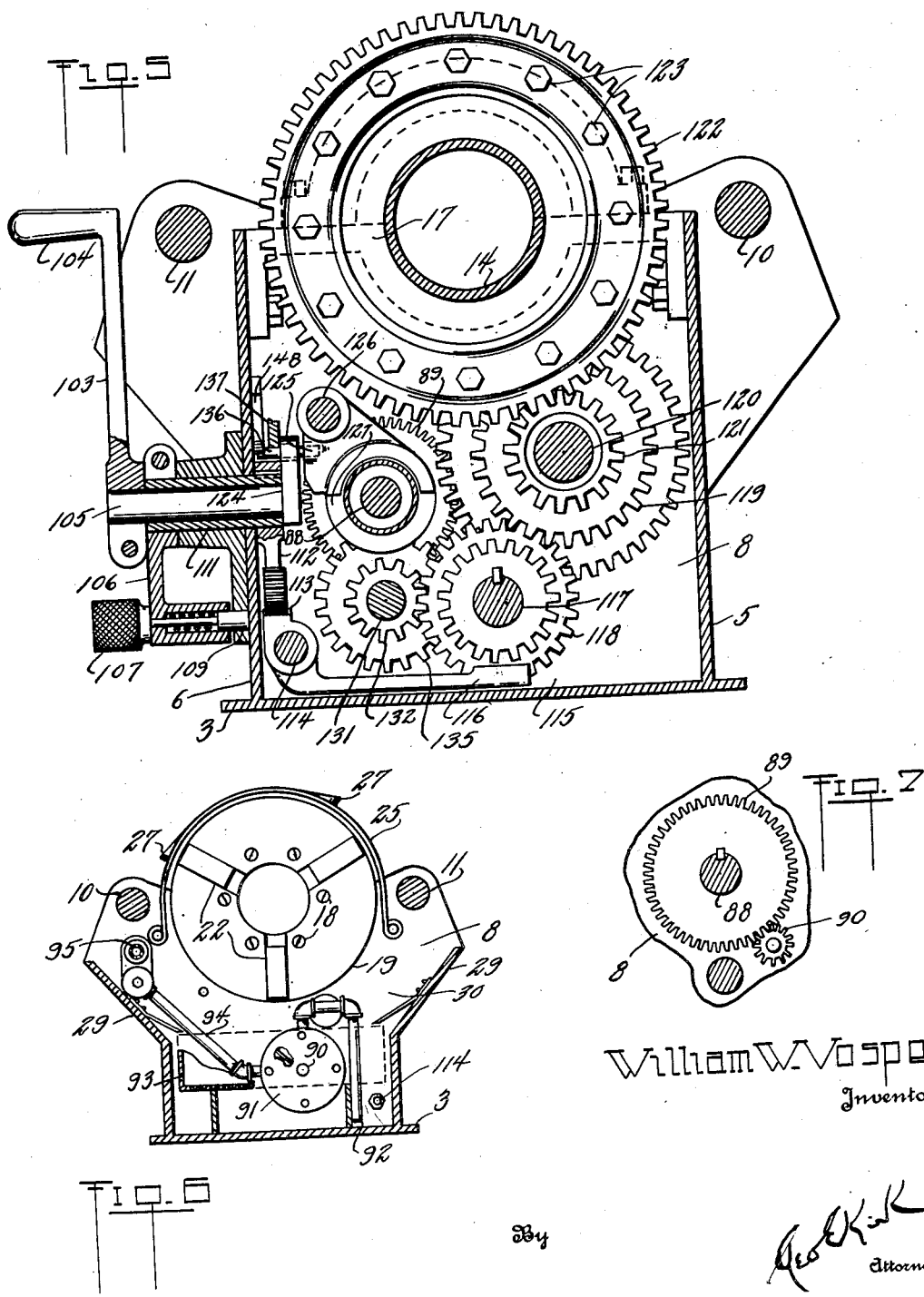

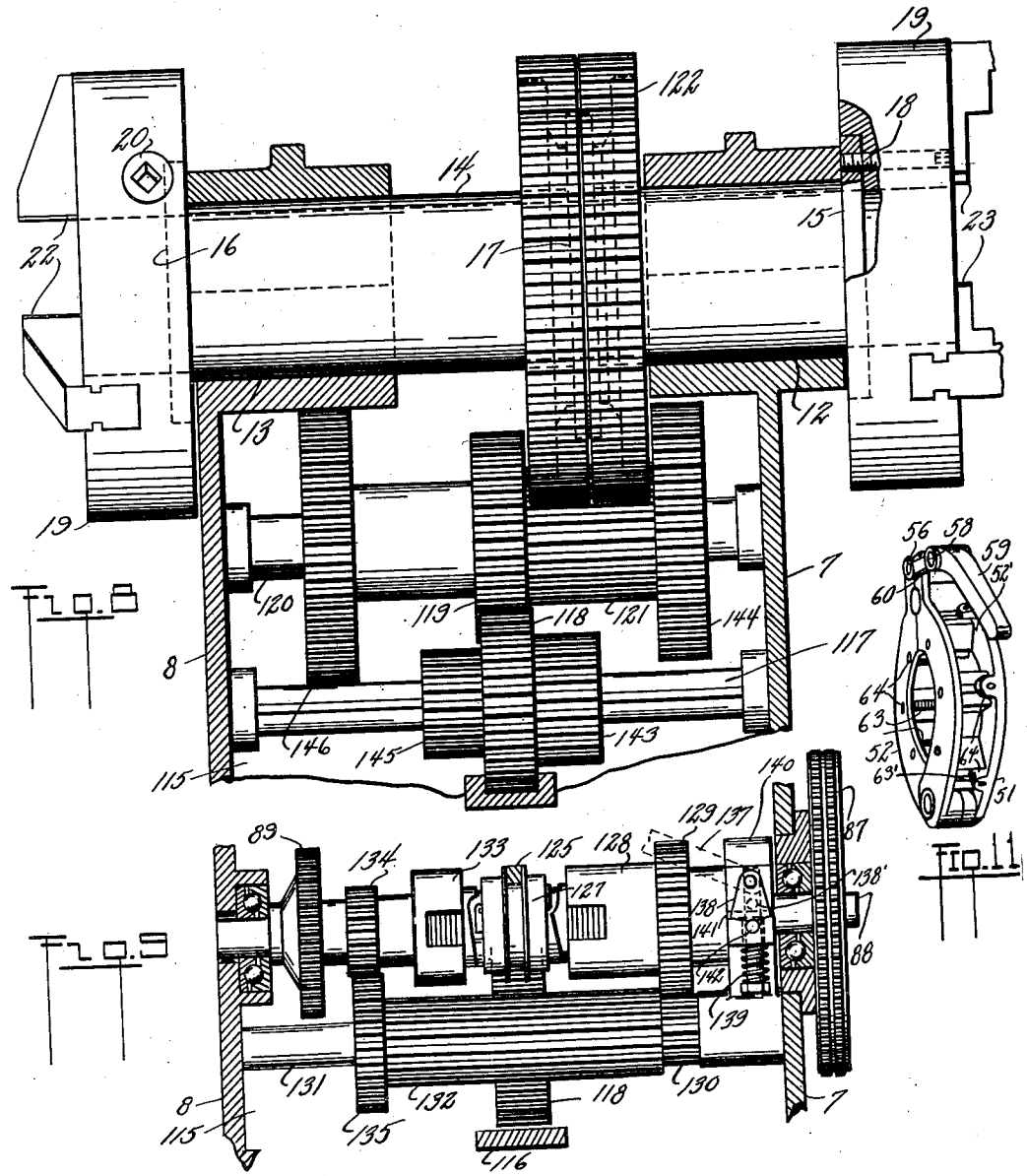
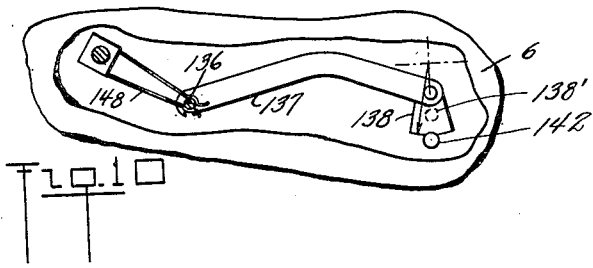

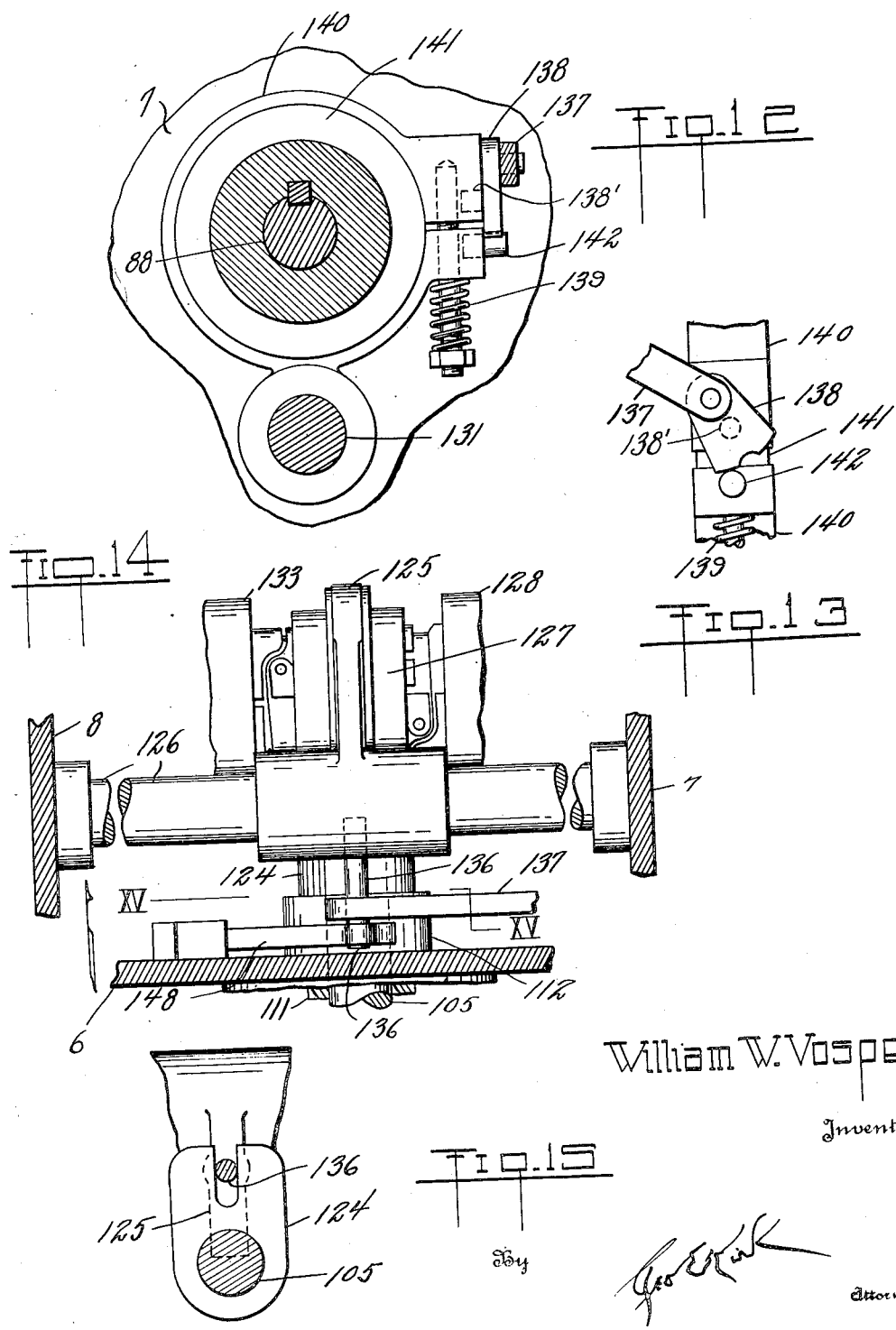

Patented Jan. 16, 1934

1,943,643

UNITED STATES PATENT OFFICE 1,943,643

POWER TOOL

William W. Vosper, Toledo, Ohio, assignor to
The Toledo Pipe Threading Machine Co.,
Toledo, Ohio, a corporation of Ohio Application September 21, 1931
Serial No. 564,064

12 Claims. (Cl. 10—89)

This invention relates to power tools for effecting relative rotation between elements of work or between a tool or tools and work.

This invention has utility when incorporated in cutting, threading, chamfering and pipe fitting operations.

Referring to the drawings:

Fig. 1 is a side view of an embodiment of the invention in a pipe machine;

Fig. 2 is a fragmentary view from the left of Fig. 1;

Fig. 3 is a side elevation with parts broken away of the machine of Fig. 1 from the opposite side;

Fig. 4 is a section on the line IV—IV, Fig. 3, looking in the direction of the arrow;

Fig. 5 is a section on the line V—V, Fig. 3, looking in the direction of the arrow;

Fig. 6 is a section on the line VI—VI, Fig. 1, looking in the direction of the arrow;

Fig. 7 is a fragmentary detail of the drive for the circulatory pump;

Fig. 8 is a detail view of the carrier and gearing connection thereto;

Fig. 9 is a detail view of features of the change-speed-gear connection;

Fig. 10 is a view of brake control features;

Fig. 11 is a detail view of the die head; Fig. 12 is a view of the brake band and its cooperating drum from the left of such brake band and drum in Fig. 9; Fig. 13 is a fragmentary view of the brake drum releasing device at released position from the showing of the engaged position in Fig. 9; Fig. 14 is a plan view of features of the clutch and its operating connections as shown in mid-portion of Fig. 9; and Fig. 15 is a view on the line XV—XV, Fig. 14.

Legs 1, with pan 2 therebetween intermediate their height, provide a rigid support for table top 3 herein shown as a sheet metal bottom anchored by bolts 4 with the table leg structure (Fig. 1). Weld assembled with each other and this bottom 3 are side plates 5, 6, extending longitudinally, with cross-plates 7, 8, 9, therebetween. These cross-plates 7, 8, 9, mount parallel bars 10, 11 (Fig. 4), and provide bearings 12, 13 (Fig. 8), for tubular carrier 14. This carrier 14 has welded thereto terminal flanges 15, 16, and intermediate larger diameter flange 17.

Bolts 18 mount chucks 19 on the flanges 15, 16. These chucks 19 have sockets 20 to be engaged by wrench 21 rotatable to move jaws 22 radially into and out of gripping position on work. These chucks 19 overhang beyond the bearings 12, 13. The axis of this carrier 14 is parallel to and in a common plane with the axes of the bars 10, 11. The chuck 19 on the flange 15 overhanging rearwardly of the machine may be provided with inwardly stepped jaws 23 adapting this chuck for ready engagement with fittings. In the event the wrench may not be removed from the socket 20 at the operation of the machine, guide forks 24 on the respective bars 10, 11, insure throwout of such wrench 21, thereby avoiding any jamming in the machine operation regardless of which direction the rotation of the chuck 19 may have.

The chuck 19 on the flange 16, intermediate the extent of the machine, is provided with cover or oil shield 25 against throwing of liquid or particles outward during machine operation. This shield mounted between the bars has slot 26 therethrough to expose the wrench sockets 20. This slot has terminal cam rim portion 27 effective as are the throwout forks 24 to disconnect the wrench 21 in the event the machine should be started without the removal of such wrench. Between the cross-plates 7, 8, there is housing 28 (Figs. 1, 2). Between the cross-plates 8, 9, the side plates 5, 6, have upper outwardly flaring portions 29 (Fig. 4) to leave the section of the machine open as a hopper 30.

Mounted on the rod 10 is hub 31 (Figs. 1, 4) having stop 32 in off position abutting against pipe 33 below the bar 10. In this position arm 34 terminating at handle 35 is outward from the carrier axis in its extent from the bar 10. This arm 34 intermediate of its extent is provided with cone 36 having cutting blade 37 for chamfer operation.

In pipes this is an effective reamer which in swinging the handle 35 downward brings this cone 36 into the line of the axis for the carrier 14. The hub 31 is held from dropping below this axial position by lug or stop 38 coming into engagement with the opposite side of the pipe 33 to that engaged by stop 32. It is thus seen that in rotation of the carrier this reamer blade 37 may be brought into line of the axis of the pipe of the work and in the plane of the axis of hub 39 and the hub 31. The hub 31 may be slid along the bar 10 into the end of the pipe for effecting its reaming operation during the rotation of the pipe either clockwise or in a counter-clockwise direction.

Toward the plate 9 from the hub 31, hubs 39, 40, on the bars 10, 11, mount yoke 41 (Fig. 4) housing scroll plate 42 having teeth 43 to be engaged by pinion 44 on shaft 45 operable by ratchet handle 46. This scroll 42 engages radially shiftable blocks 47 terminally carrying cutters 48 effective, as radially moved inward by the ratchet 46, in severing a pipe.

This yoke 41 has pins 49, 50, extending therefrom parallel to each other and in the plane of the axis of the rotary carrier. This plane is shown as approximately at right angles to the plane through the carrier axis determined by the bars 10, 11. Die head semi-circular section 51 is assembled with companion semi-circular die head 52 by hollow bearing 53, which may be slipped over the pin 49. These die head sections 51, 52, have complementary seat portions 54 for engaging the pin 50. The section 52 has upstanding lug 55 having pivot pin 56 for link 57 extending to pivot pin 58 of handle 59. This handle 59 has link extension 60 past the pivot pin 58 to pivot pin 61 in lug 62 of the die head section 51. This open die head unit carrying chasers which may be substituted and adjusted, is a feature contributing to the range of usefulness not only in cutting threads but in ready spilling of chips through the head clear of the work.

By lifting the handle 59 the toggle links 57, 60, spread the die head sections 51, 52, so that a threaded pipe therein may be released or so that the pipe may be thrust through this die head into position at one side thereof, say toward the plate 8 therefrom. Each of these die head sections 51, 52, has cutting tools or chasers 63 in sequence therein detachably locked by bolts 64 after being adjusted by bolts 63' in lugs 64' for determining a thread cutting operation during relative rotation between the head and work. The die head has chip clearance way 52' from the chasers between the parallel walls of the head. With the die head brought to a desired position clear of the work, the handle 59 may be thrust inward to bring the seats 54 to embrace the pin 50. The toggle is thus in locking position with the pivot pin 61 slightly above the line between the axis of the pivot pins 56 and 58. The toggle is thus effectively locked in the ring position for the die head 51, 52. The pin 50 is shown as having cutaway portions 65 which may be engaged by forked plate 66 as a wedge effectively holding the die head with the yoke 41 during the cutting operation. This die head is accordingly one which may be readily released and have a different size or pitch head substituted therefor.

The hub 40 has rack 67 with which may engage pinion 68 on shaft 69 through bearing 70 in the flare portion 29 from the plate 6. This hub 70 is provided with index marker 71. The shaft 69 remote from the pinion 68 is provided with radially operating arms 72 on hub 73 fast with the shaft 69. Friction ring 74 carrying graduations 75 is normally rotatable with hub 70 and the shaft 69 but may be angularly adjusted to bring the series of graduations 75 into a desired, say zero position with the pointer 71.

When the cutters 63 are about to engage the work from such zero position, operation of the handle 72, say manually to get the cutting tools to take hold, with the automatic feed after such taking hold has started, has such distance of threading travel disclosed by the graduations 75 so that the operator of the machine may readily determine the extent of thread cutting even up to uniformity in a series of operations.

The plate 3 on its lower side may be provided with pair of guides 76 (Fig. 1) to mount drawer 77 which may be a convenient receptacle for wrenches 21 substitute die heads 51, 52, for different sizes of pipe, as well as supplemental jaws for the chucks and cutting elements.

In connecting the machine up for power operation, fitting 78 may be plugged into socket 79 with the connections through fuses 80 in fuse box 81. Conduit 82 from this fuse box 81 extends to motor 83 having shaft 84 mounting a sprocket pinion 85 over which passes sprocket chain 86 to sprocket wheel 87 normally giving continuous rotation to shaft 88 having thereon gear 89 (Figs. 7, 9) in mesh with pinion 90 directly connected to rotary pump 91 (Fig. 6). This pump 91 has intake pipe 92 from the lower part of the hopper 30 in which is located perforate bottom basket 93 to catch the turnings and cuttings and allow the screw cutting oil or liquid to filter therethrough. This liquid drawn by the pump 91 through the pipe 92 is delivered by the pump 93 through pipe 94 to pipe 95 for connection with the pipe 33. This pipe 95 has telescopic connection with the pipe 33 from which extends riser 97 past valve 98 for spilling the liquid or oil from nozzle 99 upon work adjacent to the yoke 41 whether such be cutoff, reaming or threading.

Mounted on the plate 6 is switch box 100 (Fig. 3) having reversing switch 101 connected by conduit 102 for controlling the motor 83 in either a forward or reverse direction of operation. Inasmuch as the pump 91 is a centrifugal pump, in either direction of operation the circulating liquid is maintained for its flow.

Multiple speed control may be selectively obtained hereunder at six speeds. This, coupled with the reverse, means that there are twelve speeds of operation. In the design of the machine hereunder this has utility for efficiently operating under a range of conditions. For relatively high speed of operation, pipe up to 2" may be handled. For the next lower speed the pipe may be 2½" and 3", and for the still lower speed 3½" and 4" pipe. For instance, the cutting speeds for the threading of 2" pipe may be 40.1 R. P. M.; 2½" and 3" pipe, 22.8 R. P. M.; 3½" and 4" pipe, 17.1 R. P. M.; for cutting off, speed for 1" to 2" pipe may be 144 R. P. M.; 2½" and 3", 81.8 R. P. M.; 3½" and 4" pipe, 61.5 R. P. M. These several speeds may be either forward or reverse.

Mounted on the plate 6 is control arm 103. This arm 103 is mounted on shaft 105 which has loosely thereon, exterior of the machine, arm 106 with spring pin 107 assisting in locating the arm in position in openings 108, 109 and 110.

With the arm 106 located to have the spring pin 107 in the opening 109, sleeve 111 about the shaft 105 is so positioned to locate segment 112 that its engagement with rack 113 (Fig. 5) so reciprocates such rack along rod 114 in chamber 115 of the housing between the cross-plates 7, 8, that fork 116 (Figs. 5, 8) effects shifting of slidable gears on shaft 117 to locate gear 118 in mesh with gear 119 on shaft 120 (Fig. 8).

On this shaft 120 and fixed with the gear 119 is gear 121 in mesh with gear 122. This gear 122 embodies a pair of sections clamped by bolts 123 into frictional gripping engagement with the flange 17 on the carrier 14. There is thus provided frictional gripping connection which may allow slipping of the drive relatively to the work as engaged by the chucks so that breakage of machine may not occur through meeting exceptional resistance. This connection between the gears 118, 119, may be the speed for rotation in the handling of 1" to 2" pipe. To effect driving the handle 104 may be rocked clockwise. This movement is independent of the locked arm 106. This shaft 105 (Fig. 5) in this rocking shifts arm 124 fixed thereon. This arm 124 has forked free end to engage pin 136 and thus move fork 125 along guide rod 126. This movement will shift clutch operating collar 127 (Fig. 9) to render multiple disk clutch 128 effective for locking shaft 88 in driving connection with pinion 129 in mesh with pinion 130 on shaft 131 having fixed therewith pinion 132 in mesh with the pinion 118. Accordingly, there is the drive for rotation of the carrier 14 through this system of gearing at one speed. For a lower speed the handle 104 is rocked in the reverse or counter-clockwise direction, thereby shifting the fork 125 to carry the clutch collar 127 to engage multiple disk clutch 133 and thus effect driving from shaft 88 through pinion 134 and gear 135 to the long pinion 132 in mesh with the gear 118.

At once the handle 104 is shifted from upright position for the arm 103, the pin 136 is engaged by the forked free end of the arm 124. This pin 136 as carried by the clutch operating fork 125 is caused to shift lever 137 (Figs. 5, 9, 10) to rock wedge 138 from its medial short radius position. This means that in the rocking from such neutral position spring 139 is compressed and brake band 140 about brake drum 141 fast on the shaft 88 is released.

This release of the shaft 88 occurs before the clutch operating collar 127 has effected clutch or drive engagement. In practice, at once the handle 104 is thrown from neutral, up or upright position there is unclutching of the drive notwithstanding the motor 83 may be continuously operated to run the oil circulating pump 91. This cutting off of the power results in immediate stopping of the gear train, for the wedge 138 is swung to its neutral position so that the spring 139 as adjusted may render the brake band 140 effective to grip the brake drum 141.

In the selection of speeds for pipe of 2½" to 3" the pin 107 is located in the opening 110. This causes the segment 112 to shift the rack 113 so that the fork 116 effects shifting along the shaft 117 (Fig. 8) to bring pinion 143 into mesh with gear 144 fast with the gear 121 on the shaft 120. This gives the higher speed rotation, when the handle 104 is shifted to have the clutch 128 effective and gives a lower rotation when the handle 104 is oppositely rocked to have the other clutch effective.

With the spring pin 107 located in the opening 108 the segment 112 is effective to shift the rack 113 and the fork 116 to bring pinion 145 on the shaft 117 (Fig. 8) into mesh with gear 146 on the shaft 120 fixed with the gear 121. This is for the speeds of operation explained as for 3½" and 4" diameter pipe operations. The two speeds are determined here by the opposite rockings of the handle 104. Each rocking of the handle from neutral position releases the brake and operates the clutch, while toward neutral position disconnects the clutch and sets the brake.

Shield 147 may be provided for the sprocket chain 86.

These ranges of speeds which, in shifting the switch 105 upward for one direction of running the motor 83 and downward for the other direction of rotation for the motor 83, give the wide range of flexibility in this power drive. These speeds and directions of operation may thus be utilized not only in connection with cutting operations but even for assembling or disconnecting couplings or fittings. The overhang chuck 19 outward from the after part of the machine and clear of the plate 7 permits utilization not only for gripping pipe fittings by the jaws 23 but for assembling a fitting on a pipe as in the carrier 14 or disconnecting a fitting from such pipe whether or not the threading be right or left hand.

The operator may feel when the handle 104 is back to neutral position to unclutch the drive and set the brake (Fig. 10), because of the resistance of spring 148. This rocking of the wedge 138 is on its axis 138' and allows pin 142 to come to neutral position at the wedge 138 for effective braking.

The motor 83 is mounted to swing from the bar 10 by eyes 149 on plate 150 (Fig. 1). By adjusting bolt 151 the plate 150 and the motor 83 are swung on the bar 10 as an axis to adjust the chain 86 to the proper taut condition.

Drain plug 152 may be taken out when it is desired to draw off the residue of liquid from the hopper 30.

What is claimed and it is desired to secure by Letters Patent is:

1. A power tool for work of revolution embodying a hollow carrier, a chuck mountable on the carrier, a pair of bars parallel to each other and to the axis of the carrier, a tool mounted on the bars and provided with a rack, a pinion extending transversely of the bars and engaging the rack for shifting the tool toward and from the chuck, a bearing for the pinion, there being a pointer fixed with the bearing, and a scale providing collar angularly adjustable relatively to the pinion for checking the lineal travel of the tool along the work.

2. A power tool for work of revolution embodying a hollow carrier, a chuck mountable on the carrier, a built up frame therefor comprising a pair of tool-carrying bars, a plurality of parallel cross-plates anchored with the bars locating the bars in parallel and providing bearings on axes perpendicular to the plates for locating the carrier axis in parallel with the axes of the bars, and plates anchored to the cross-plates parallel to the bars for spacing the cross-plates along the bars and providing a bottom and a pair of opposing sides parallel to each other adjacent the bottom.

3. A power tool for work of revolution embodying a hollow carrier, a chuck mountable on the carrier, and a built up frame therefor comprising a pair of tool-carrying bars, three cross-plates locating the bars parallel to each other and providing aligned bearings on axes perpendicular to the plates for locating the carrier parallel to the bars, a pair of side plates having upper flare portions between two of the cross-plates, and a bottom plate between the cross-plates, said plates being weld assembled, said side plates having portions parallel one with the other.

4. A power tool for work of revolution embodying a hollow carrier, a chuck mountable on the carrier, a pair of bars parallel to each other and to the axis of the carrier, a yoke mounted on the bars for movement toward and from the chuck in axial alignment therewith, pins mounted with the yoke parallel to the carrier axis, a multi-section split ring unit die head detachably anchored with one of the pins, said sections being swingable relatively to each other on said one pin as a hinge to engage the other pin, and locking means for holding the sections in embracing relation on said other pin.

5. A power tool for work of revolution embodying a hollow carrier, a chuck mountable on the carrier, a pair of bars parallel to each other and to the axis of the carrier, a yoke mounted on the bars for movement toward and from the chuck in axial alignment therewith, a pair of pins mounted with the yoke parallel to the carrier axis, a pair of die head sections hinged together and mounted on one of said pins, and means mounted on and coacting between the sections for drawing said sections into operative position to engage the other of said pins, said sections and means being removable from the pins as a unit.

6. A power tool for work of revolution embodying a hollow carrier, a chuck mountable on the carrier, a pair of bars parallel to each other and to the axis of the carrier, a yoke mounted on the bars for movement toward and from the chuck in axial alignment therewith, a pair of pins mounted with the yoke parallel to the carrier axis, a pair of die head sections, a hollow hinged bearing connecting the sections, said hollow bearing being mounted on one of said pins, and a toggle connection mounted on and coacting between the sections for locking the sections at the other pin, said sections and toggle connection being removable from the pins as a unit.

7. A power tool for work of revolution embodying a hollow carrier, a chuck mountable on the carrier, a pair of bars parallel to each other and to the axis of the carrier, a yoke mounted on the bars for movement toward and from the chuck in axial alignment therewith, a pair of pins mounted with the yoke parallel to the carrier axis, a pair of semicircular die head sections directly hinged together at one pair of termini and a toggle connection at the other termini including a pair of links mounted solely upon said sections, one of said links having an extension providing a toggle operating arm, said sections and links being removable as a unit from said pins, and as mounted on said pins, said unit being in operative position in axial alignment with said yoke.

8. A power tool for work of revolution embodying a hollow carrier, a chuck mountable on the carrier, a pair of bars parallel to each other and to the axis of the carrier, a yoke mounted on the bars for movement toward and from the chuck in axial alignment therewith, a pair of pins mounted with the yoke parallel to the carrier axis, a pair of die head sections, a hollow hinged bearing connecting the sections, said hollow bearing being mounted on one of said pins, a toggle connection for locking the sections at the other pin, and means for anchoring the sections on the pin, said means including a U-plate.

9. A power tool for work of revolution embodying a hollow carrier, a chuck mountable on the carrier, a pair of horizontally extending bars parallel to each other and to the axis of the carrier, tool means mounted on the bars for movement toward and from the chuck in axial alignment therewith, and passage-providing means comprising a telescopic duct having a pressure fluid supply first section providing a stop for one of the tool means in inoperative position, a second section connected to and movable with one of the tool means, said sections extending parallel to the axis of the chuck, and a riser delivery nozzle from the second section to be directed upon work at the tool means.

10. A power tool for work of revolution embodying a hollow carrier, means providing a pair of bars for the carrier, a chuck on one end of the carrier, a motor, gearing from the motor to the carrier, a reversible contol for the motor, change speed gearing between the motor and carrier, a brake for the carrier, a rockable selector for different speeds of the gearing, and a handle mounted concentric of the selector and having connection for releasing the brake as a selected speed for driving the carrier is made effective.

11. A power tool for work of revolution embodying a hollow carrier, a frame including a pair of bars axially parallel to the carrier, a chuck on the carrier for mounting work, a tool mounted by the bars and movable therealong for engaging the work, a motor, bracket means rockably mounting the motor in depending position from one of the bars and axially parallel to the chuck on the side of the chuck away from the tool, gearing from the motor to the carrier in the plane of the rocking of the motor, and means for adjusting the motor as to the gearing by shifting the motor as suspended by said bracket and relatively to the bar in said plane.

12. A power tool for work of revolution embodying a yoke, a pair of pins mounted by the yoke, a pair of die head sections, means hinging the sections on one of said pins, and a toggle connection mounted upon and movable with the sections for locking the sections at the other pin.

WILLIAM W. VOSPER.